United States Patent Office 2,892,603
Patented June 30, 1959

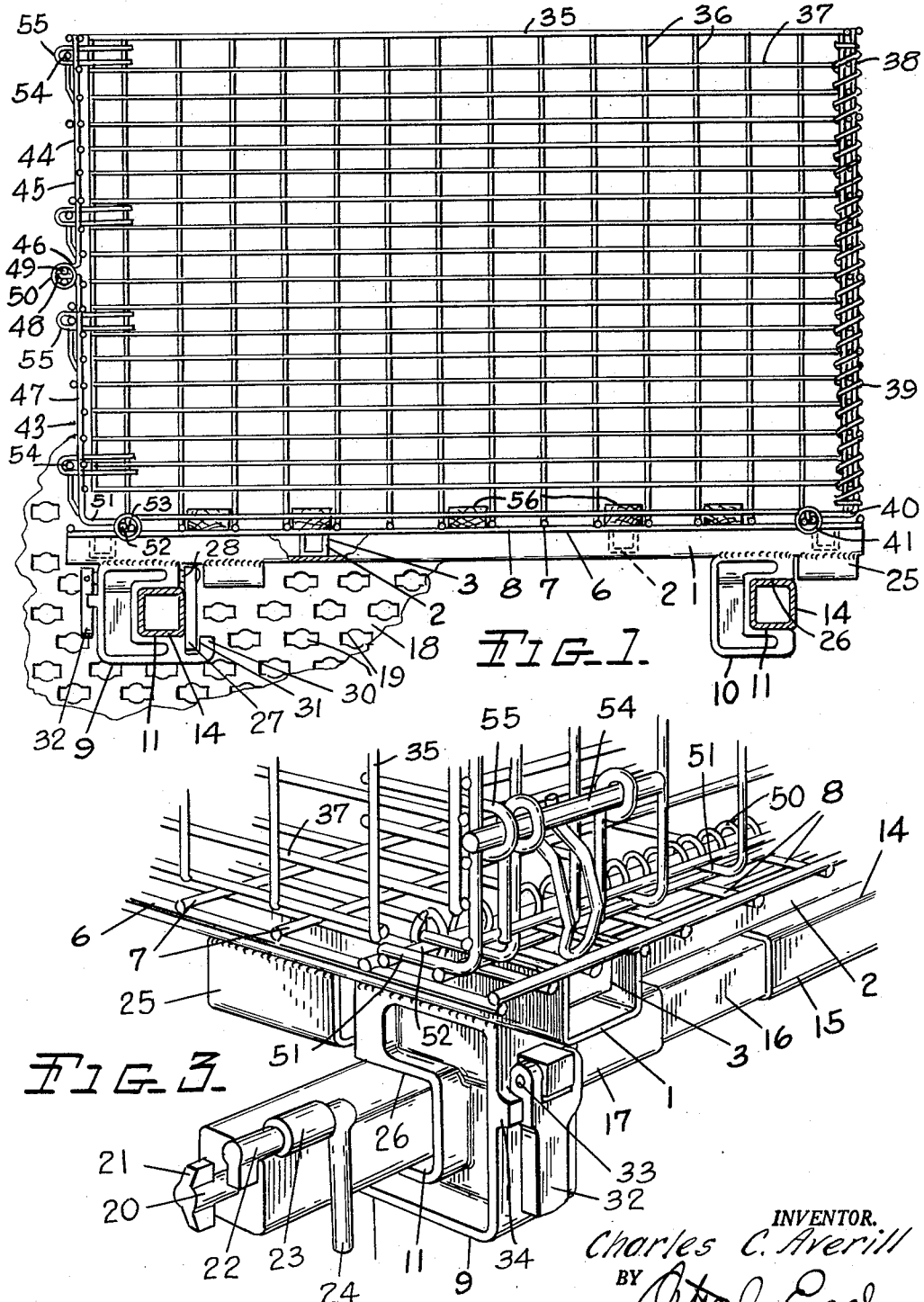

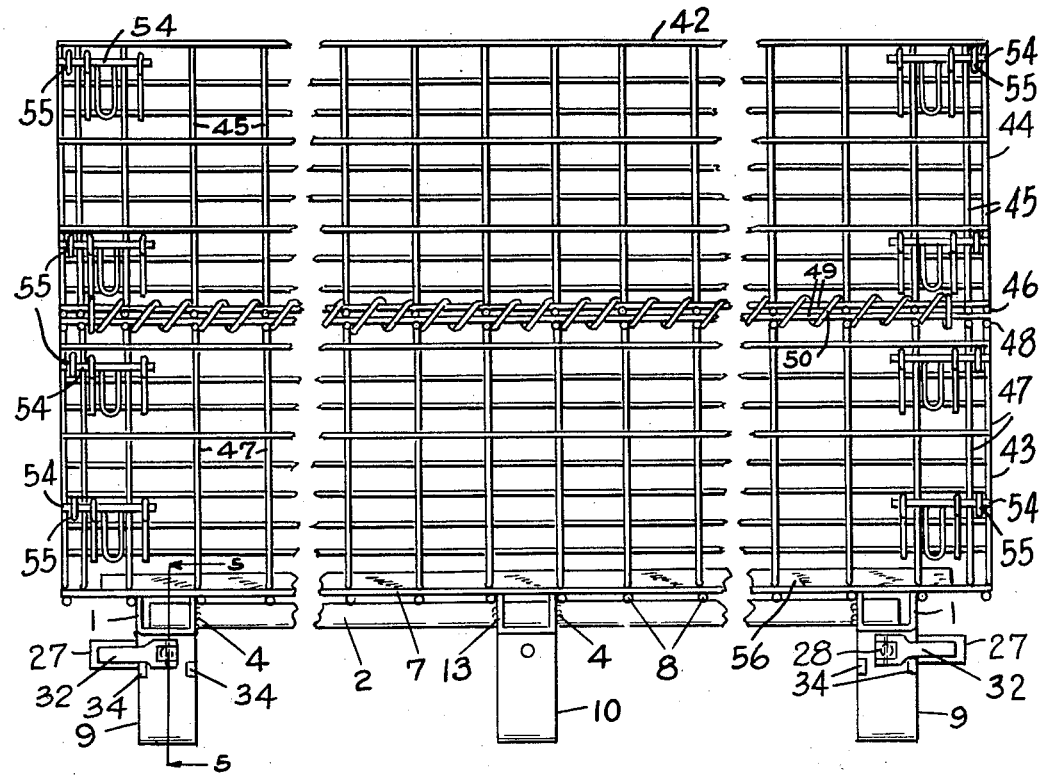
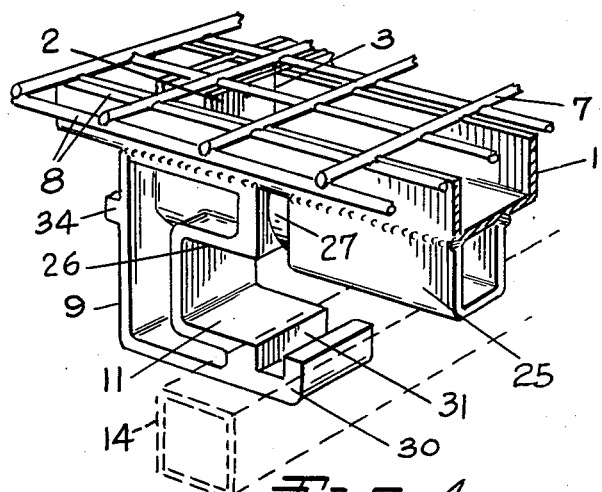
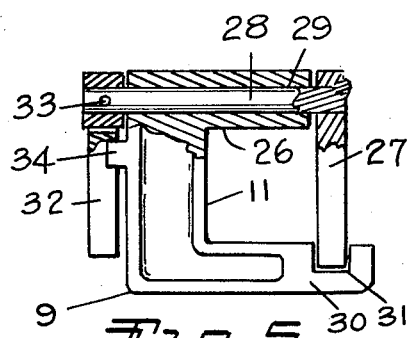
INVENTOR.
Charles C. Averill
BY
Otis A. Earl
Attorney.

2,892,603

MATERIALS HANDLING PALLET

Charles C. Averill, Albion, Mich., assignor to Union Steel Products Company, Albion, Mich.

Application December 6, 1954, Serial No. 473,148

9 Claims. (Cl. 248—120)

This invention relates to a materials handling pallet well adapted for use in shipping loaded pallets in freight cars, trucks and trailers or the like.

The main objects of this invention are:

First, to provide a materials handling pallet which may be readily mounted on supporting bars or members to prevent shifting or displacement of the pallet from its located position as a result of shocks, speed variations and the like to which freight cars, trucks, trailers and the like are commonly subjected to in use.

Second, to provide a materials handling pallet having legs which are engageable with support members by a horizontal sliding or shifting movement of the pallet on the support members; and also to provide a pallet having these advantages with means for locking the legs in engagement with the support members.

Third, to provide a materials handling pallet having these advantages which is adapted for handling by means of lift trucks.

Fourth, to provide a materials handling pallet in which one of the walls is formed of collapsible sections to facilitate loading and unloading of the pallet.

Objects relating to details and economies of the invention will appear from the description to follow. The invention is defined and pointed out in the claims.

A preferred embodiment of the invention is illustrated in the accompanying drawing, in which:

Fig. 1 is an end elevational view of a walled pallet embodying my invention, the bar-like support members being shown in section, parts of the pallets being broken away to show certain structural details, a fragment of a wall of a freight car with which the support members may be detachably engaged being illustrated.

Fig. 2 is a fragmentary side elevational view looking from the left of Fig. 1 with the wall part and supports shown in that figure omitted and support member retaining latches being shown in retracted position.

Fig. 3 is an enlarged perspective view of a pallet with a supporting bar in engaged relation therewith.

Fig. 4 is a perspective view showing certain details of the structure and indicating a step which may desirably be practiced in the mounting of the pallet on the supporting bars.

Fig. 5 is a fragmentary view partially in section on a line correspondng to 5—5 of Fig. 2 showing details of the leg, its keeper and the latch.

The embodiment of my invention illustrated comprises side bed members 1 of upwardly facing channel section and transverse bed members 2 also desirably of upwardly facing channel section. The transverse bed members are disposed through openings 3 provided therefor in the inner flanges of the side bed members and fixedly secured thereto, desirably by welding as indicated at 4.

The deck illustrated designated generally by the numeral 6 comprises an upper series of parallel slats desirably of wire or light rods 7 and a lower series 8, the upper and lower series being disposed in crossing relation and fixedly connected at their crossing points. The bed members are in supporting relation to these slats. Legs 9 mounted on the side bed members 1 and legs 10 are mounted on the central bed bar 13.

The legs 9 and 10, in the embodiment illustrated, are formed as castings and have laterally opening recesses 11 facing in the same direction. The recesses 11 are conformed to receive the support members or bars 14 which in this embodiment are tubes of rectangular section. The support members 14 are made up of telescoping sections 15, 16 and 17 to facilitate the engagement thereof with opposed supporting walls 18 which are provided with a plurality of noncircular openings 19 with which the supporting lugs 20 on the end section 17 of the support members may be engaged, the lugs 20 being provided with heads 21 which may be passed through the holes 18 when presented endwise thereto and lockingly retained therein by giving the support members a quarter rotating turn.

To prevent rotation of the support members after being so engaged the end sections of the members are provided with dogs 22 pivotally mounted at 23 and provided with handles 24. The dogs are so spaced in relation to the lugs 20 that they may be passed through one of the holes 19 and turned to locking position. The dogs have both a longitudinal sliding and a rotative movement in their supports 23 to facilitate this engagement. The manner of mounting the support members and the structure thereof form no part of this invention but one means is illustrated to show the adaptability of the pallet of my invention for use in connection with support members of this type used in freight cars and the like.

To facilitate the engagement of the legs with the support members the bed members 2 are provided with guide members 25 which are mounted on the undersides of the bed members in front of the recessed legs, the lower sides of these guides being aligned with the upper sides 26 of the recesses in the legs so that the pallet may be positioned on these guide members and the legs engaged with the support members by a horizontal sliding movement of the pallet on the support members.

The support members are laterally spaced to correspond to the spacing of the legs. To releasably retain the pallet on the support members the legs 9 are provided with latches 27 fixedly secured to the pivot rods or spindles 28 disposed in bores 29 extending through the legs above the recesses therein.

The legs 9 are provided with forward projections 30 at the bottoms thereof the projections having upwardly facing notches 31 positioned to receive the lower edges of the latches when they are adjusted to close the recesses and retain the legs in engagement with the supports. These notched extensions constitute keepers for the latches and sustain the disengaging thrust thereon.

The spindles 28 are provided with handles 32 mounted on their outer ends by the pivots 33 extending transversely through the latch pivots 28. The handles are desirably aligned with the latches 27. The outer ends of the legs 10 are provided with spaced lugs 34 between which the latch handles depend when the latches are in keeper engaging position. The handles may be engaged with one of these lugs 34 to hold the latches in open position as is shown in Fig. 2.

It will be understood that these materials handling pallets are commonly loaded and mounted upon the support members and one desirable procedure in engaging the supporting bars is to first position the legs upon a support member, as indicated at 14 in Fig. 4, which enables the operator of the lifting truck to position the pallet for convenient manipulation to engage the legs with the support members. After so positioning the pallet it is lifted slightly and retracted and lowered until the guide members 25 rest upon the support members and the pallet is then moved forwardly to position the support members within the leg recesses and the latches are then locked to hold the pallet in such engagement. Thus mounted the pallets cannot materially shift their position within the freight car or other transporting vehicle.

End walls 35 of the pallet in the embodiment illustrated are formed of a plurality of vertical rod-like slats 36 and similar horizontal slats 37 fixedly connected at their crossing points. One end wall 38 is similarly formed.

The side walls are hingedly connected to the ends of the end walls to collapse thereon by means of the coiled hinge members 39. The end wall 38 has inwardly offset arms 40 at its lower end hingedly secured to the deck in spaced relation as by the edge of the hinge member 41.

The opposite end wall designated generally by the numeral 42 comprises a bottom section 43 and a top section 44 likewise formed of vertical and horizontal slats. The lower ends of the vertical slats 45 of the upper section have outturned knuckle portions 46 while the upper ends of the vertical slats 47 of the lower section have outturned knuckle members 48. The pivot or hinge rods 49 are secured to these outturned ends and swingably or hingedly connected by the coiled hinge members 50.

The lower ends of the uprights or vertical slats of the lower wall section have inturned hinge arms 51 at their lower ends provided with hinge pivot rods 52 which are connected to adjacent deck bars by means of hinge members 53. The upper and lower sections are both provided with bolts 54 at the ends thereof preferably at least to each end. Both being engageable with looplike keepers 55 on the ends of the side walls 35 for releasably supporting the end wall sections in erected position. This arrangement greatly facilitates the loading and the unloading of the pallet.

In the structure illustrated the deck is provided with a plurality of spaced parallel bars 56, desirably of wood. The purpose of these bars being primarly to minimize the abrading of the materials loaded on the pallet which quite commonly have finished surfaces.

It will be understood that the terms "sides" and "ends" are used merely for convenience in describing the relation of certain parts and not as indicating dimensions.

I have illustrated my invention in a very practical commercial embodiment thereof. I have not attempted to illustrate or describe other embodiments or adaptations such for example, as might be required for special arrangement of support as it is believed this disclosure will enable those skilled in the art to embody or adapt my invention as may be desired.

Having thus described my invention, what I claim as new and desire to secure by Letters Patent is:

1. In a material handling pallet, the combination of a deck provided with laterally spaced bed members, legs spaced longitudinally of and secured to the undersides of said bed members to project downwardly therefrom, the legs of the bed members being transversely aligned, said legs having laterally opening support engaging recesses facing in the same direction, at least one pair of corresponding transversely aligned legs having manually operable means for releasibly securing the legs upon a common support.

2. In a materials handling pallet, the combination of a deck provided with laterally spaced bed members, legs spaced longitudinally of and fixedly secured to said bed members and having laterally opening support engaging recesses facing in the same direction, said bed members having guide members on their undersides disposed with their lower edges in aligned relation with the tops of the recesses of the legs to facilitate the engagement of the legs with support members by sliding movement of the pallet on the support members, one of the legs secured to each bed member having an upwardly facing keeper, latches pivotally mounted on the legs provided with keepers for lateral swinging adjustment to and from keeper engaging position, the upper pivoted ends of the latches being disposed between the legs and the guide member which constitute guards for the pivoted end of the latches and for the latches when they are in retracted position, latch adjusting handles connected to their pivots and disposed at the sides of the legs opposite said recesses therein, the legs being provided with pairs of lugs with which the handles automatically engage when the latches are in keeper engaging position, said handles being engageable with one of the lugs for supporting the latches in recessed clearance retracted position.

3. In a materials handling pallet, the combination of a deck provided with laterally spaced bed members, legs spaced longitudinally of and fixedly secured to said bed members and having laterally opening support engaging recesses facing in the same direction, said bed members having guide members on their undersides disposed with their lower edges in aligned relation with the tops of the recesses of the legs to facilitate the engagement of the legs with the support members by sliding movement of the pallet on the support members, one of the legs secured to each bed member having an upwardly facing keeper, latches pivotally mounted on the legs provided with keepers for lateral swinging adjustment to and from keeper engaging position, the upper pivoted ends of the latches being disposed between the legs and the guide member which constitute guards for the pivoted end of the latches and for the latches when they are in retracted position, and means for adjusting said latches and supporting them in keeper engaging and in retracted position.

4. In a materials handling pallet, the combination of a deck provided with laterally spaced bed members, legs spaced longitudinally of and fixedly secured to said bed members and having laterally opening support engaging recesses facing in the same direction, one of the legs secured to each bed member having an upwardly facing keeper, latches pivotally mounted on the legs provided with keepers for lateral swinging adjustment to and from keeper engaging position, and latch adjusting handles connected to their pivots and disposed at the sides of the legs opposite said recesses therein, the legs being provided with pairs of lugs with which the handles automatically engage when the latches are in keeper engaging position, said handles being engageable with one of the lugs for supporting the latches in recessed clearance retracted position.

5. In a materials handling pallet, the combination of a deck provided with laterally spaced bed members, legs spaced longitudinally of and fixedly secured to said bed members and having laterally opening support engaging recesses facing in the same direction, one of the legs secured to each bed member having an upwardly facing keeper, latches pivotally mounted on the legs provided with keepers for lateral swinging adjustment to and from keeper engaging position, and means for adjusting said latches and supporting them in keeper engaging and in retracted position.

6. In a materials handling pallet, the combination of a deck provided with fixed laterally spaced bed members, legs spaced longitudinally of and fixedly secured to said bed members and having laterally opening support engaging recesses facing in the same direction, one of the legs secured to each bed member having recess closure members adjustably mounted thereon for adjustment to recess closing position or to clearance position, and slide members mounted on the undersides of said bed members with their lower edges in aligned relation to the tops of the recesses of the legs to facilitate engagement and disengagement of the legs with support members by sliding movement of the pallet on the support members, said slide members constituting guards for said closure members when the closure members are in retracted position.

7. In a materials handling pallet, the combination of a deck provided with fixed laterally spaced bed members, legs spaced longitudinally of and fixedly secured to said bed members and having laterally opening support engaging recesses facing in the same direction, one of the legs secured to each bed member having recess closure members adjustably mounted thereon for adjustment to recess closing position or to clearance position, and slide members mounted on the undersides of said bed members with their lower edges in aligned relation to the tops of the recesses of the legs to facilitate engagement and disengagement of the legs with support members by sliding movement of the pallet on the support members.

8. In a materials handling pallet, the combination of a deck provided with laterally spaced bed members, legs spaced longitudinally of the bed member and fixedly secured thereto and having laterally opening support engaging recesses facing in the same direction, said bed members having support engaging slides on their undersides disposed in aligned relation to the tops of the recesses and slidably engageable with support members facilitating the engagement and disengagement of legs with support members while the pallet is supportingly engaged with the support members, and manually operated means for closing the recesses for releasably retaining the legs in engagement with support members engaged in said leg recesses.

9. In a materials handling pallet, the combination of a deck provided with legs fixedly secured thereto and having laterally opening support engaging recesses facing in the same direction, support engaging slides fixedly secured to said deck in aligned relation to the tops of the recesses and slidably engageable with support members facilitating the engagement and disengagement of legs with support members while the pallet is supportingly engaged with the support members, and means for closing the recesses for releasably retaining the legs in engagement with support members engaged in said leg recesses.

References Cited in the file of this patent

UNITED STATES PATENTS

| | | |
|---|---|---|
| 984,563 | Holmes | Feb. 21, 1911 |
| 1,065,045 | Hartmann | June 17, 1913 |
| 1,207,345 | Tomarin | Dec. 5, 1916 |
| 2,632,578 | Brickman | Mar. 24, 1953 |
| 2,634,932 | Withers | Apr. 14, 1953 |
| 2,668,681 | Kappen | Feb. 9, 1954 |
| 2,681,744 | Averill | June 22, 1954 |
| 2,695,724 | Averill | Nov. 30, 1954 |
| 2,738,940 | Coit | Mar. 20, 1956 |